Patented Apr. 22, 1930

1,755,972

UNITED STATES PATENT OFFICE

ROBERT STOCKER, OF BASEL, SWITZERLAND, ASSIGNOR TO SOCIETY OF CHEMICAL INDUSTRY IN BASLE, OF BASEL, SWITZERLAND

INDIGOID DYESTUFFS AND PROCESS OF MAKING SAME

No Drawing. Application filed July 7, 1926, Serial No. 121,055, and in Switzerland July 29, 1925.

The present invention relates to new indigoid dyestuffs obtainable from chlorotoluidine ($CH_3:NH_2:Cl=1:2:6$) which are valuable for the production of fast tints. It comprises the process of making the new dyestuffs, the dyestuffs themselves, and the material dyed with the new dyestuff.

It has been found that new indigoid dyestuffs may be obtained as follows:—

In a first step chloro-o-toluidine ($CH_3:NH_2:Cl=1:2:6$)

is converted into xanthic acid chlorotolyl ester by diazotization and combining of the diazo compound obtained with an alkali salt of xanthic acid.

In a second step the product thus formed is transformed into the chlorothiocresol ($CH_3:SH:Cl=1:2:6$)

by treatment with saponifying agents, such as solutions of caustic alkalis.

In a third step the named chlorothiocresol is converted into the 2-methyl-3-chlorophenylthioglycollic acid by condensation with a mono-halogen-acetic acid.

In a fourth step the 2-methyl-3-chlorophenylthioglycollic acid is condensed by means of halides of inorganic hydroxy acids, as for instance phosphorous trichloride, and condensing agents, to the corresponding 6-chloro-7-methyl-3-hydroxythionaphthene.

In a fifth step the 6-chloro-7-methyl-3-hydroxythionaphthene is first treated with aromatic nitroso compounds, as for instance p-nitrosodimethylaniline or p-nitrosophenol, to form an anil of the 6-chloro-7-methylthionaphthenequinone, and then converted by treatment with saponifying agents, as for example dilute sulfuric acid, into 6-chloro-7-methyl-thionaphthenequinone.

In a sixth step the products which may be obtained by the processes of the fourth and fifth step, and which correspond with the general formula:

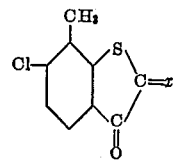

wherein $x$ stands for a reactive group such as O, anil or 2H, are condensed with compounds of the general formula:

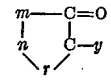

wherein $y$ represents a reactive group, such as O, halogen, anil, 2H, and $m$, $n$ and $r$ atoms of which two are carbon atoms adjacent to each other, which at the same time appertain to an aromatic ring system, and of which the third is NH, S or C.

Such compounds are for instance five-membered condensed ring systems, as for example isatins, indoxyls, thionaphthenequinones, hydroxythionaphthenes, naphthohydroxythiophenes, acenaphthenequinones and the like, their homologues and substitution products, anils and halides.

This reaction takes place by heating the components in a solvent which may act as condensing agent, in certain cases by addition of oxidizing agents.

The dyestuffs thus obtained correspond with the general formula

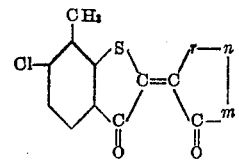

wherein $r$, $m$ and $n$ have the signification as has hereinbefore been defined. They form orange to red, violet and brown powders, which dissolve in concentrated sulfuric acid 90 to violet to brown, green and yellowish-green solutions, yielding with hydrosulfite and caustic soda solution greenish-yellow to yellow and violet vats which dye cotton fast orange to red, violet, brown and grey tints. These dyestuffs may further be converted into dyestuffs containing more halogen by subsequent halogenation.

The following examples illustrate the invention, but without limiting it, the parts being by weight.

*Example 1*

71 parts of 6-chloro-ortho-toluidine $$(CH_3 : NH_2 : Cl = 1 : 2 : 6)$$

are diazotized in known manner and the mixture is introduced into a solution of 90 parts of potassium xanthate and 80 parts of soda ash at 70° C. When evolution of gas has come to an end the mixture is allowed to cool and extracted with ether. The ether is evaporated and the residue, which consists very probably of the xanthic acid chlorotolylester of the formula

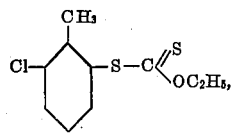

is saponified by heating it in a reflux apparatus with 125 parts of caustic soda solution of 40° Bé. and 300 parts of alcohol, and in the same solution the product is condensed with 70 parts of chloroacetic acid, dissolved in 84 parts of caustic soda solution of 40° Bé. and water. The spirit is distilled and the residue allowed to cool and acidified with hydrochloric acid. The 2-methyl-3-chlorophenyl-thioglycollic acid corresponding with the formula

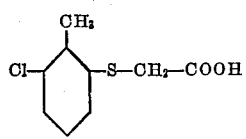

is filtered and dried. When recrystallized from dilute alcohol it forms white needles, which melt at 104° C.

28 parts of this product are dissolved in 280 parts of phosphorus trichloride, 22 parts of aluminium chloride are added and the whole is heated gradually to 60–65° C. Hydrogen chloride is evolved freely and the liquid assumes a red brown color. The excess of phosphorus trichloride is distilled in a vacuum and the residue introduced into a mixture of ice and water for the purpose of decomposing the compounds of phosphorus and aluminium. After filtering the product is dissolved in dilute caustic soda solution and the solution is filtered and acidified to precipitate the product.

The 6-chloro-7-methyl-3-hydroxythionaphthene corresponding with the formula

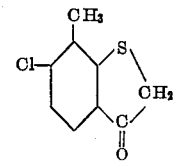

is a colorless substance which crystallizes from dilute acetic acid in beautiful needles melting at 102–103° C. It is sparingly soluble in alcohol, ether, ligroin and benzene. It can easily be purified by distillation with steam.

*Example 2*

19.8 parts of 6-chloro-7-methyl-3-hydroxythionaphthene are dissolved in 100 parts of caustic soda solution of 12 per cent strength and the solution is heated 40–50° C. and mixed with a solution of 16.5 parts of para-nitrosodimethylaniline in 100 parts of alcohol. Condensation occurs at once and the thick magma is filtered and the solid matter washed with hot water until the filtrate is colorless. The new para-dimethylaminoanil of 6-chloro-7-methylthionaphthenequinone thus obtained corresponding with the formula

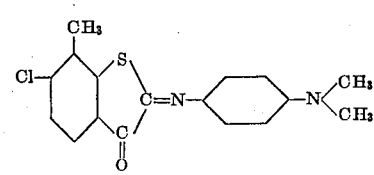

dissolves in hot benzene to a red solution and crystallizes on cooling in beautiful needles of green lustre and melting point 256–257° C.

When 34.9 parts of the compound are introduced into 300 parts of sulfuric acid of 60° Bé. and heated cautiously to 60° C. whilst stirring, the color of the mass becomes brown-red and there is precipitated in good yield 6-chloro-7-methyl-thionaphthenequinone. This is filtered, washed until free from acid and crystallized from benzene. The new thioisatin thus obtained corresponding with the formula

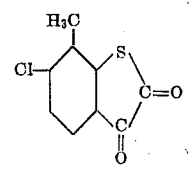

forms brown-red needles of melting point 154° C.

*Example 3*

19.8 parts of 6-chloro-7-methyl-3-hydroxythionaphthene are dissolved in 1000 parts of caustic soda solution of 2 per cent strength and air is blown through the solution at 60–70° C., until the quantity of the dyestuff produced does not increase. This new 6:6'-dichloro-7:7'-dimethylthioindigo of the formula

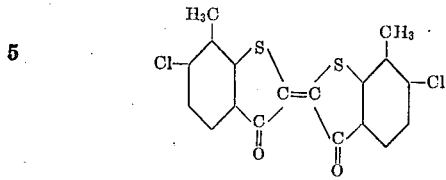

is filtered, washed free from alkali and dried. It is a carmine-red powder which dissolves in sulfuric acid to a yellowish-green solution. It dyes cotton in a greenish-yellow hydrosulfite vat bright carmine-red tints of pronounced fastness to washing and chlorine.

*Example 4*

305 parts of 5:7-dibromisatin are suspended in 3000 parts of chlorobenzene and the mixture is heated after addition of 229 parts of phosphorus pentachloride. The solution of 5:7-dibromisatinchloride thus obtained is allowed to flow at a temperature of 70–80° C., and whilst stirring, into a solution of 198 parts of 6-chloro-7-methyl-3-hydroxythionaphthene in 2000 parts of chlorobenzene, whereby the dyestuff corresponding with the formula

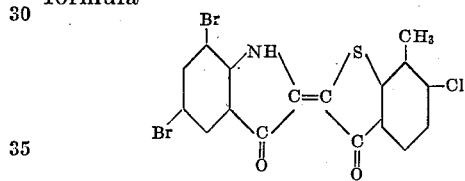

is immediately precipitated. It is filtered, washed and dried. It is a violet powder which dissolves in sulfuric acid to a green solution and forms a golden-yellow vat and dyes cotton violet tints of very good fastness.

*Example 5*

198 parts of 6-chloro-7-methyl-3-hydroxythionaphthene and 182 parts of acenaphthenequinone are suspended in 4000 parts of alcohol and, after addition of 4 parts of concentrated hydrochloric acid, the mixture is heated to boiling. The condensation is complete after a short boiling. The dyestuff corresponding with the formula

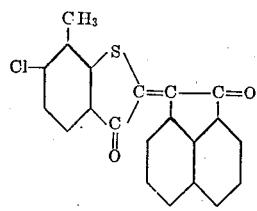

which separates in good yield is filtered, washed and dried. It is an orange powder, soluble in sulfuric acid to a bright green solution. It forms a violet-red vat and dyes cotton pure orange tints of very good fastness.

*Example 6*

198 parts of 6-chloro-7-methyl-3-hydroxythionaphthene and 330 parts of the para-dimethylaminoanil of 5-chloro-7-methyl-thionaphthenequinone are suspended in 4000 parts of benzene and the suspension is heated to boiling. The condensation is complete after a short boiling. The dyestuff corresponding with the formula

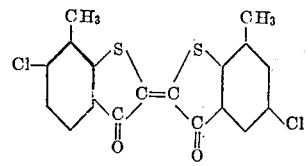

separates in good yield and is filtered and dried. It forms a carmine-red powder soluble in sulfuric acid to a yellowish-green solution. It forms a pale yellow vat and dyes cotton bluish-rose tints of very good fastness.

The same dyestuff is produced by condensing 6-chloro-7-methyl-thionaphthenequinone-para-dimethyl-aminoanil or 6-chloro-7-methyl-thionaphthenequinone with 5-chloro-7-methyl-3-hydroxythionaphthene.

In an analogous manner a dyestuff of a redder shade is obtained by replacing the para-dimethylaminoanil of the 5-chloro-7-methylthionaphthenequinone by the corresponding anil of the 6-chloro-4-methylthionaphthenequinone. The para-dimethylaminoanil of 6-ethoxythionaphthenequinone leads to a dyestuff of more scarlet shade.

*Example 7*

198 parts of 6-chloro-7-methyl-3-hydroxythionaphthene and 332 parts of the para-dimethylaminoanil of 2:3-thionaphthisatin ($\beta_1\beta_2$-naphththiofurane-1:2-dione) are suspended in 4000 parts of benzene. The condensation is finished after a short boiling. The dyestuff corresponding with the formula

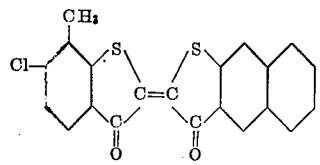

which separates in good yield is filtered and dried. It is a violet-grey powder which dissolves in sulfuric acid to a green solution. It forms a golden yellow vat and dyes cotton grey-blue tints.

*Example 8*

394 parts of the dyestuff made in accordance with Example 7 are introduced into 6000 parts of nitrobenzene and 352 parts of bromine are added. Within 30 hours the temperature is raised gradually to 140° C. After cooling the solid matter is filtered, washed with alcohol and dried. It constitutes the new dyestuff and is a violet-brown powder, soluble in sulfuric acid to a green solution. The dyestuff forms a yellow-orange vat and dyes cotton pure violet tints of pronounced fastness. A similar product is obtained by chlorinating the dyestuff of Example 7.

The following table comprises further examples of dyestuffs obtainable from 6-chloro-7-methyl-3-hydroxythionaphthene in accordance with the invention.

| | 6-chloro-7-methyl-3-hydroxythionaphthene and— | Color of the dyestuff | Color in sulfuric acid | Color of the vat | Color of the dyed cotton |
|---|---|---|---|---|---|
| I | 5-bromo-2:1-thionaphthisatin (5-bromo-$\beta_1,\alpha_1$-naphththiofurane-1:2-dione) | Brown | Violet | Orange-brown | Brown. |
| II | 1:2-thionaphthisatin ($\alpha_1,\beta_1$-naphththiofurane-1:2-dione) | Brown | Green | Golden-yellow | Bordeaux-red. |
| III | $\alpha$-isatinanilide | Violet | Green | Pale yellow | Violet. |
| IV | 5:7-dibromisatin | Brown | Brown | Orange-brown | Red-brown. |
| V | Para-dimethylaminoanil of thionaphthenequinone | Brown | Green | Pale yellow | Red. |
| VI | Para-dimethylaminoanil -of 6-chlorothionaphthenequinone | Red-brown | Green | Yellow | Red. |
| VII | 1-chloro-2:3-thionaphthisatin (1-chloro-$\beta_1,\beta_2$-naphththiofurane-1:2-dione) | Violet-red | Green | Orange | Violet. |

The dyestuff No. II corresponds with the formula:

The dyestuff No. IV corresponds with the formula:

The dyestuff No. VII corresponds with the formula:

What I claim is:

1. As a step in the manufacture of new indigoid dyestuffs obtainable from chlorotoluidine ($CH_3:NH_2:Cl=1:2:6$), the herein described process consisting in the manufacture of xanthic acid chlorotolylester, by diazotizing the above named chlorotoluidine, and treating the diazo compound thus obtained with an alkali metal salt of xanthic acid.

2. As a step in the manufacture of new indigoid dyestuffs obtainable from chlorotoluidine ($CH_3:NH_2:Cl=1:2:6$), the herein described production of the chlorothiocresol ($CH_3:SH:Cl=1:2:6$), by treatment of the xanthic acid chlorotolylester, obtained according to the process of claim 1, with alkalies.

3. As a step in the manufacture of new indigoid dyestuffs obtainable from chlorotoluidine ($CH_3:NH_2:Cl=1:2:6$), the herein described production of the 2-methyl-3-chlorophenylthioglycollic acid, by treatment of the chlorothiocresol ($CH_3:SH:Cl=1:2:6$) with a salt of a monohalogeno-acetic acid.

4. As a step in the manufacture of new indigoid dyestuffs obtainable from chlorotoluidine ($CH_3:NH_2:Cl=1:2:6$), the herein described production of the 6-chloro-7-methyl-3-hydroxythionaphthene, by treatment of the 2-methyl-3-chlorophenylthioglycollic acid with a halide of an inorganic hydroxy acid and with a condensing agent.

5. As a step in the manufacture of new indigoid dyestuffs obtainable from chlorotoluidine ($CH_3:NH_2:Cl=1:2:6$), the herein described production of the anils of the 6-chloro-7-methylthionaphthenequinone, by treating the 6-chloro-7-methyl-3-hydroxythionaphthene with an aromatic nitroso compound, and saponifying the anil thus obtained.

6. As a step in the manufacture of new indigoid dyestuffs obtainable from chlorotoluidine ($CH_3:NH_2:Cl=1:2:6$), the herein described condensation of the products corresponding with the general formula in which $x$ represents a reactive group, such as O, anil, 2H, with products having the general formula wherein $y$ represents a reactive group, such as O, halogen, anil, 2H, and $m$, $n$ and $r$ represent atoms of which two are carbon atoms adjacent to each other, which at the same time appertain to an aromatic ring system, and of which the third is NH, C or S.

7. The manufacture of new indigoid dyestuffs obtainable from chlorotoluidine

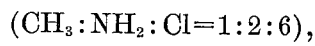

by diazotizing, in a first step, the above named chlorotoluidine and treating the diazo-compound thus obtained with an alkali metal salt of xanthic acid, by treating, in a second step, the xanthic acid chlorotolylester thus obtained with alkalies, by treating, in a third step, the chlorothiocresol

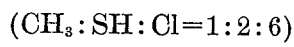

thus obtained with a salt of a mono-halogenoacetic acid, by treating, in a fourth step, the 2-methyl-3-chlorophenylthioglycollic acid thus obtained with a halide of an inorganic hydroxy acid and a condensing agent, by treating, in a fifth step, the 6-chloro-7-methyl-3-hydroxythionaphthene thus obtained with products corresponding with the general formula

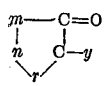

wherein $y$ represents O or an equivalent atom or residue, and $m$, $n$ and $r$ represent atoms of which two are carbon atoms adjacent to each other, which at the same time appertain to an aromatic ring system, and of which the third is NH, C or S.

8. As new products of manufacture the herein described new unsymmetrical indigoid dyestuffs of the general formula.

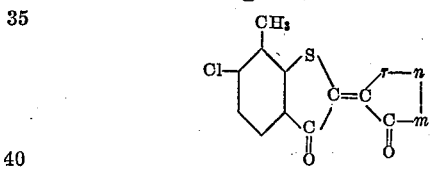

wherein $r$, $n$ and $m$ stand for atoms of which two are carbon atoms adjacent to each other, which at the same time appertain to an aromatic ring system, and of which the third is NH, S or C, which products form orange to red, violet and brown powders, which dissolve in concentrated sulfuric acid to violet to brown, green, and yellowish-green solutions, yielding with hydrosulfite and caustic soda solution greenish-yellow to yellow and violet vats which dye cotton fast orange to red, violet, brown and grey tints.

9. As new products of manufacture the herein described new indigoid dyestuffs of the general formula

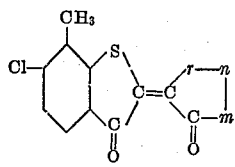

wherein $r$, $n$ and $m$ stand for atoms of which two are carbon atoms adjacent to each other, which at the same time appertain to an aromatic ring system of the benzene series, and of which the third is NH, S or C, which products form orange to red and brown powders, which dissolve in concentrated sulfuric acid to brown to green and yellowish-green solutions, yielding with hydrosulfite and caustic soda solution greenish-yellow to yellow and violet vats, which dye cotton fast orange to red, violet and brown tints.

10. As new products of manufacture the herein described new indigoid dyestuffs of the general formula

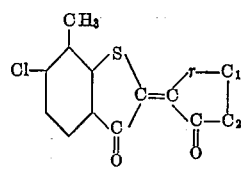

wherein $r$ represents S or NH, and in which the two carbon atoms $C_1$ and $C_2$ appertain to an aromatic ring system of the benzene series, which products dissolve in concentrated sulfuric acid to brown, green and yellowish-green solutions, yielding with hydrosulfite and caustic soda solution yellow to greenish-yellow vats, which dye cotton fast red to violet and brown tints.

11. As new products of manufacture the herein described indigoid dyestuffs of the general formula

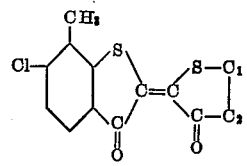

wherein the two carbon atoms $C_1$ and $C_2$ appertain to an aromatic ring system of the benzene series, which products form red to carmine and violet powders, which dissolve in concentrated sulfuric acid to green solutions, yielding with hydrosulfite and caustic soda solution yellow to green vats which dye cotton fast red to rose and violet tints.

12. As new products of manufacture the herein described new indigoid dyestuffs of the formula

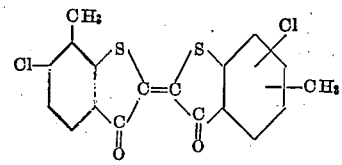

which form red to carmine-red products, dissolving in concentrated sulfuric acid to green solutions, yielding with hydrosulfite and caustic soda solution yellow to greenish-yellow vats which dye cotton fast bluish-red to rose tints.

13. Material dyed with the products of claim 8.

14. Material dyed with the products of claim 9.

15. Material dyed with the products of claim 10.

16. Material dyed with the products of claim 11.

17. Material dyed with the products of claim 12.

In witness whereof I have hereunto signed my name this 22nd day of June, 1926.

ROBERT STOCKER.